(12) United States Patent
Jang

(10) Patent No.: US 9,479,023 B2
(45) Date of Patent: Oct. 25, 2016

(54) TERMINAL HOUSING FOR MOTOR AND MOTOR EMPLOYING THE SAME

(71) Applicant: LG INNOTEK CO., LTD., Seoul (KR)

(72) Inventor: Yoon Hae Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 97 days.

(21) Appl. No.: 13/998,512

(22) Filed: Nov. 7, 2013

(65) Prior Publication Data

US 2014/0125169 A1 May 8, 2014

(30) Foreign Application Priority Data

Nov. 8, 2012 (KR) .................. 10-2012-0126304

(51) Int. Cl.
| | |
|---|---|
| *H02K 11/00* | (2016.01) |
| *H01R 13/648* | (2006.01) |
| *H01R 9/26* | (2006.01) |
| *H01R 4/48* | (2006.01) |
| *H02K 5/22* | (2006.01) |

(52) U.S. Cl.
CPC ............. *H02K 5/225* (2013.01); *H02K 5/22* (2013.01)

(58) Field of Classification Search
CPC .............................. H02K 5/22; H02K 3/18
USPC ............ 310/71; 489/384; 439/384, 680, 716
See application file for complete search history.

(56) References Cited

U.S. PATENT DOCUMENTS

| 6,336,824 B1 * | 1/2002 | Sorig ............................ 439/441 |
| 2007/0077809 A1 * | 4/2007 | Takashita ...................... 439/492 |
| 2008/0280508 A1 * | 11/2008 | Koellmann ................... 439/834 |
| 2013/0069457 A1 * | 3/2013 | Kim ............................... 310/71 |

* cited by examiner

*Primary Examiner* — Jose Gonzales Quinones
(74) *Attorney, Agent, or Firm* — Ked & Associates, LLP

(57) ABSTRACT

A terminal housing for a motor comprises a terminal connected to a coil of a stator via one portion thereof. A terminal housing main body includes an inserting hole formed therein and provides a chamber for receiving the other portion of the terminal. The terminal is inserted into the inserting hole, and a curved portion formed on a side of the chamber around the terminal inserting hole. The curved portion is curved to enable the terminal to be moved thereon.

2 Claims, 3 Drawing Sheets

TERMINAL HOUSING FOR MOTOR AND MOTOR EMPLOYING THE SAME

CROSS-REFERENCE TO RELATED APPLICATION

This application claims priority to and the benefit of Korean Patent Application No. 10-2012-0126304, filed on Nov. 8, 2012, the disclosure of which is incorporated herein by reference in its entirety.

BACKGROUND

1. Field

The present disclosure relates to a terminal housing, and more particularly, to a terminal housing for a motor and a motor employing the same.

2. Background

In general, a connector consists of a terminal housing and a terminal, and has been widely utilized in a power circuit of a refrigerator, a motor vehicle, or a motor.

The terminal housing employed in the motor includes a terminal received therein, wherein one end of the terminal is connected to a coil wound around a stator teeth and the terminal is electrically connected to a terminal of another connector to be coupled to the terminal housing.

Such a terminal housing for the motor is disclosed in numerous documents including Korean registered utility mode No. 20-0235562, Korean patent laid-open publication No. 10-2006-0006608, and the like, The terminal housing for the motor disclosed in the above publication secures firmly the terminal.

Therefore, when a counterpart, that is, another terminal housing is assembled to the terminal housing for the motor after the terminal is assembled to the terminal housing for the motor, if the terminal housing for the motor secures firmly the terminal, there is a likelihood that the terminal assembled to the terminal housing for the motor and a terminal assembled to another terminal housing to be coupled to the terminal housing for the motor are damaged.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
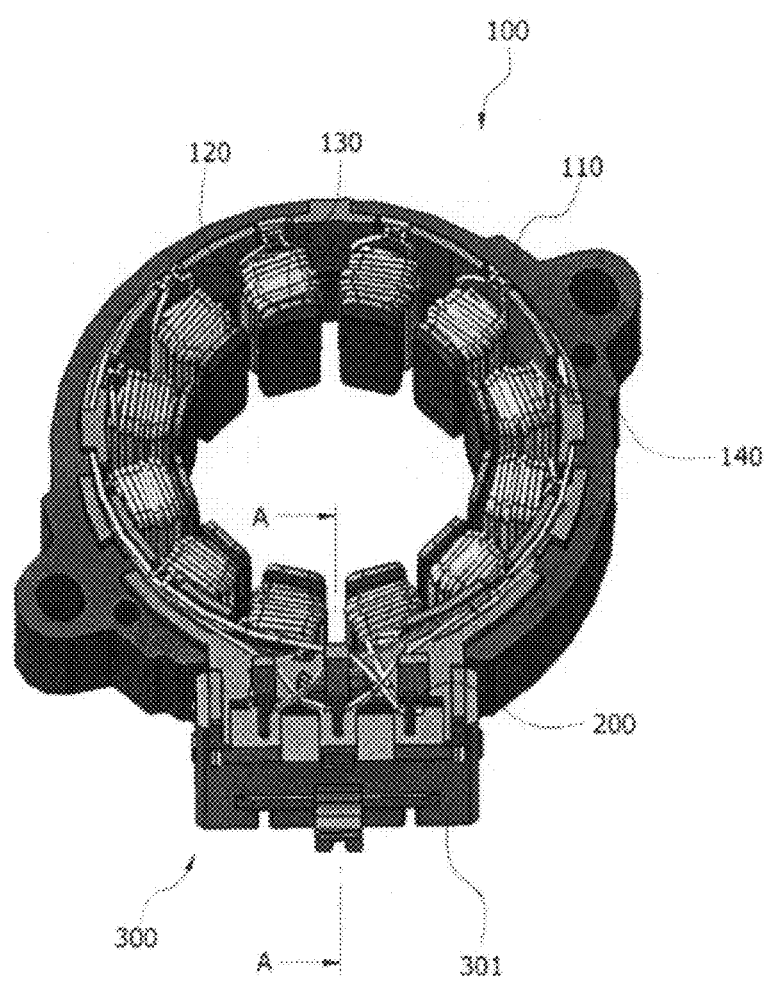
FIG. 1 is a perspective view showing a stator of a motor employing a terminal housing for a motor according to one embodiment of the present disclosure.

Since the present disclosure may be modified in various ways and may have various embodiments, specific embodiments are illustrated in the drawings and are described in detail in the present specification. However, it should be understood that the present disclosure is not limited to specific disclosed embodiments, but includes all modifications, equivalents, and substitutes encompassed within the spirit and technical scope of the present disclosure.

The terms "first," "second," etc. may be used to describe various components, but the components are not limited by such terms. The terms are used only for the purpose of distinguishing one component from other components. For example, a first component may be designated as a second component without departing from the scope of the present disclosure. In the same manner, the second component may be designated as the first component. The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no intervening component exists between them.

The terms used in the specification of the present application are used for only illustrating specific embodiments, and are not intended to limit the present disclosure. A singular expression can include a plural expression as long as it does not have an apparently different meaning in context. In the present specification, the terms "include" and "have" should be understood to be intended to designate that illustrated features, numbers, steps, operations, components, parts, or combinations thereof exist and not to preclude the existence of one or more different features, numbers, steps, operations, components, parts, or combinations thereof, or the possibility of the addition thereof.

Unless otherwise specified, all of the terms which are used herein, including the technical or scientific terms, have the same meanings as those that are generally understood by a person having ordinary knowledge in the art to which the present disclosure pertains. The terms defined in a generally used dictionary must be understood to have meanings identical to those used in the context of a related art, and are not to be construed to have ideal or excessively formal meanings unless they are obviously specified in the present specification.

The embodiment of the present disclosure will be described in detail below with reference to the accompanying drawings. The structural element which is the same as or corresponds to the structural element which is already illustrated is indicated by the same reference numeral, and an illustration thereon is omitted.

FIG. 1 is a perspective view showing a stator of a motor employing a terminal housing for a motor according to one embodiment of the present disclosure.

Referring to FIG. 1, a stator 100 of a motor employing a terminal housing for a motor according to one embodiment of the present disclosure includes a stator core 110, a plurality of teeth 120, an insulator 130, a coil 140, and a terminal housing 300 for a motor.

The stator core 110 is formed by stacking a plurality of cylindrical silicon steel plates and forms a magnetic circuit through which a magnetic field passes.

The plurality of teeth 120 are spaced apart from each other at a regular interval and protrude in the inward direction of the stator core 110.

Meanwhile, the plurality of teeth 120 may be formed of the same material as the material employed for forming the stator core 110. The plurality of teeth 120 may be formed integrally with the stator core 110. In other words, by stacking donut-shaped silicon steel plates, each of which having protrusions protruding inward and spaced from each other at a regular interval, the protrusions become the plurality of teeth 120 and the donut-shaped parts can become the stator core 110. In addition, the plurality of teeth 120 and the stator core 110 can be separately formed to enable the teeth to be inserted in the groove provided at an inner side of the stator core 110.

The insulator 130 is formed of an insulating material such as plastic and the like, and fitted to the teeth 120. This insulator 130 insulates the plurality of teeth 120 and the coil 140 wound around each of the plurality of teeth 120.

One end of a terminal 200 is connected to the coil 140, and the other end of the terminal is received in the terminal housing 300 for the motor. An external power is supplied to the coil 140 via the terminal 200 to enable the plurality of teeth 120 to form a magnetic field.

The terminal housing 300 for the motor includes a terminal housing main body 301 in which the terminal 200 is received.

If another terminal housing is inserted in the terminal housing main body 301, the terminal housing 300 for the motor constructed as above allows the terminal 200 received therein to be electrically connected to a terminal received in another terminal housing. In addition, the terminal housing 300 for the motor protects the terminals which are electrically connected to each other, against an external force or a waterlogging.

Below, the terminal housing 300 for the motor according to the present disclosure and the terminal 200 are described in more detail with reference to the drawings.

Figure 2:
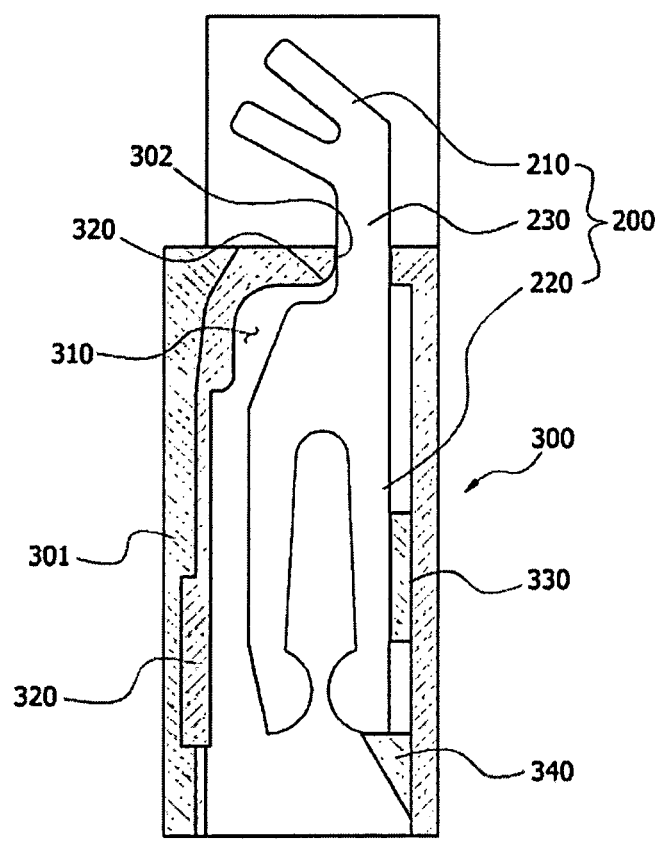
FIG. 2 is a cross-sectional view taken along line A-A in FIG. 1.

FIG. 2 is a cross-sectional view taken along line A-A in FIG. 1.

Referring to FIG. 2, the terminal housing 200 includes a coil connecting part 210 to which the coil 140 is connected, a terminal inserting part 220 into which another terminal is inserted, and a connecting part 230 connecting the coil connecting part 210 and the terminal inserting part 220. Here, the connecting part 230 is inserted into a terminal inserting hole 302 of the terminal housing 300 for the motor, which will be described later.

The terminal housing 300 for the motor includes the terminal housing main body 301, a chamber 310 formed in the terminal housing main body 301 and serving as a space into which another terminal housing is inserted and in which the terminal inserting part 220 of the terminal 200 is placed, and the terminal inserting hole 302 formed in the terminal housing main body 301 in the shape of a hole. Here, the terminal connecting part 230 is inserted into the terminal inserting hole 302.

The terms of "upward," "downward," "right," "left," "forward," and "backward" mentioned below indicate the direction or the place determined on the basis of FIG. 2.

A curved portion 321 is provided on a side of the chamber 310 around the terminal inserting hole 302 to enable the terminal connecting part 230 to be moved in the right and left directions. Due to the curved portion 321, the terminal 200 can be moved in the right and left directions or the forward and backward directions in a state where the terminal 200 is inserted into the terminal inserting hole 302.

A deviation preventing wall 320 is formed on a left inner wall of the chamber 310 for preventing a deviation of the terminal 200 from the chamber 310, which is caused by an excessive movement of the terminal 200 in the left direction. Here, the deviation preventing wall 320 may be formed by extending the left inner wall.

A movement restriction part 330 is formed on a right inner wall of the chamber 310 for enabling the terminal 200 to be moved a certain distance in the right direction. The movement restriction part 330 restricts an excessive movement of the terminal 200 in the right direction. Here, the movement restriction part 330 may be formed in a rib shape.

A downward movement restriction part 340 is formed on a lower portion of the right inner wall of the chamber 310 for enabling the terminal 200 to be moved a certain distance in the downward direction. This downward movement restriction part 340 restricts an excessive downward movement of a lower end of the terminal 200. Here, the downward movement restriction part 340 may be formed in a protrusion shape extending from the right inner wall of the chamber 310 to an inside of the chamber 310.

Below, an operation of the terminal housing for the motor according to one embodiment of the present disclosure is described with reference to the drawings.

Figure 3:
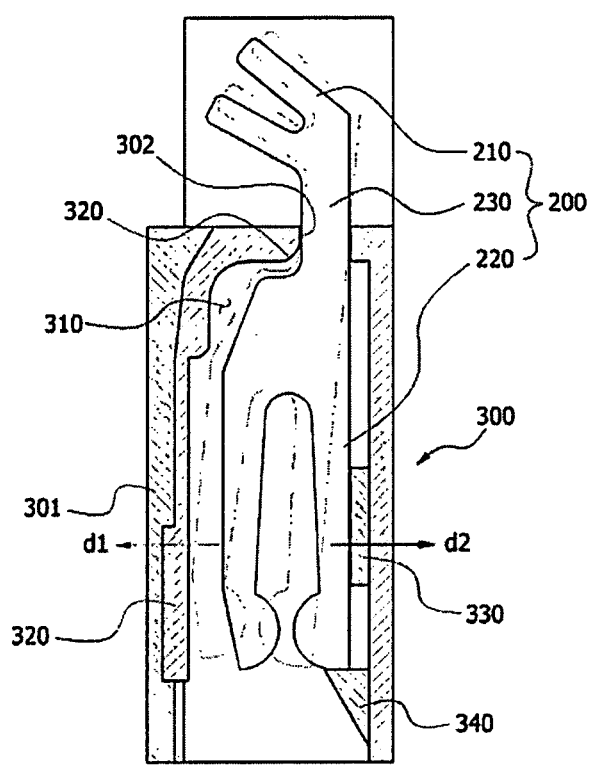
FIG. 3 is a view for illustrating an operation of a terminal housing for a motor according to one embodiment of the present disclosure.

FIG. 3 is a view for illustrating an operation of a terminal housing for a motor according to one embodiment of the present disclosure.

Referring to FIG. 3, when another terminal is inserted into the terminal housing 300 of the motor, if the other terminal is not accurately inserted into the terminal inserting part 220, the terminal 200 is moved in the left direction d1 or the right direction d2 by the curved portion 321. Due to the above, a force which is rapidly and excessively exerted to the terminal 200 is alleviated so that a damage of the terminal 200 and the terminal housing 300 for the motor is prevented.

By the present disclosure as described above, when another terminal housing is coupled to the terminal housing for the motor, it is possible to prevent the terminals assembled to these terminal housings from being damaged.

It will be apparent to those skilled in the art that various modifications can be made to the above-described exemplary embodiments of the present disclosure without departing from the spirit or scope of the disclosure. Thus, it is intended that the present disclosure covers all such modifications provided they come within the scope of the appended claims and their equivalents.

Accordingly, a technical object of the present disclosure is to provide a terminal housing for a motor, which prevents terminals assembled to the terminal housing for the motor and another terminal housing from being damaged when two terminal housings are coupled with each other, and a motor utilizing the same.

According to one aspect of the present disclosure, a terminal housing for a motor includes a terminal connected to a coil of a stator via one portion thereof; a terminal housing main body having an inserting hole formed therein and providing a chamber for receiving the other portion of the terminal, the terminal being inserted into the inserting hole; and a curved portion formed on a side of the chamber around the terminal inserting hole, the curved portion being curved to enable the terminal to be moved thereon.

According to another aspect of the present disclosure, a motor using a terminal housing for a motor includes a stator; a terminal connected to a coil of the stator through one portion thereof; a terminal housing main body having a terminal inserting hole formed therein and providing a chamber for receiving the other portion of the terminal, the terminal being inserted into the terminal inserting hole; and a curved portion formed on a side of the chamber around the terminal inserting hole, the curved portion being curved to enable the terminal to be moved thereon.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A terminal housing for a motor comprising:
   a terminal having a coil connecting part to which a coil of a stator is connected, a female terminal inserting part into which a male terminal is inserted, and a connecting part connecting the coil connecting part and the female terminal inserting part;
   a terminal housing main body having an inserting hole formed therein which the terminal connecting part is inserted into, and providing a chamber for receiving the part;
   a convexly curved portion formed on a side of the chamber adjacent to the terminal inserting hole, the curved portion being curved to enable the terminal to be moved thereon;
   a deviation preventing wall formed on a left inner wall of the chamber to prevent a deviation of the terminal from the chamber in a left direction;
   a movement restriction part formed in a protrusion shape on a right inner wall of the chamber to prevent a deviation of the terminal from the chamber in a right direction; and
   a downward movement restriction part formed in a protrusion shape on a right inner wall of the chamber to prevent a deviation of the terminal from the chamber in a downward direction.

2. A motor using a terminal housing for a motor comprising:
   a stator;
   a terminal having a coil connecting part to which a coil of a stator is connected, a female terminal inserting part into which a male terminal is inserted, and a connecting part connecting the coil connecting part and the female terminal inserting part;
   a terminal housing main body having a terminal inserting hole formed therein which the terminal connecting part is inserted into, and providing a chamber for receiving the terminal inserting part; and
   a convexly curved portion formed on a side of the chamber adjacent to the terminal inserting hole, the curved portion being curved to enable the terminal to be moved thereon;
   a deviation preventing wall formed on a left inner wall of the chamber to prevent a deviation of the terminal from the chamber in a left direction;
   a movement restriction part formed in a protrusion shape on a right inner wall of the chamber to prevent a deviation of the terminal from the chamber in a right direction; and
   a downward movement restriction part formed in a protrusion shape on a right inner wall of the chamber to prevent a deviation of the terminal from the chamber in a downward direction.

* * * * *